May 31, 1960     J. C. ANDERSEN     2,938,807
METHOD OF MAKING REFRACTORY BODIES
Filed Aug. 13, 1957
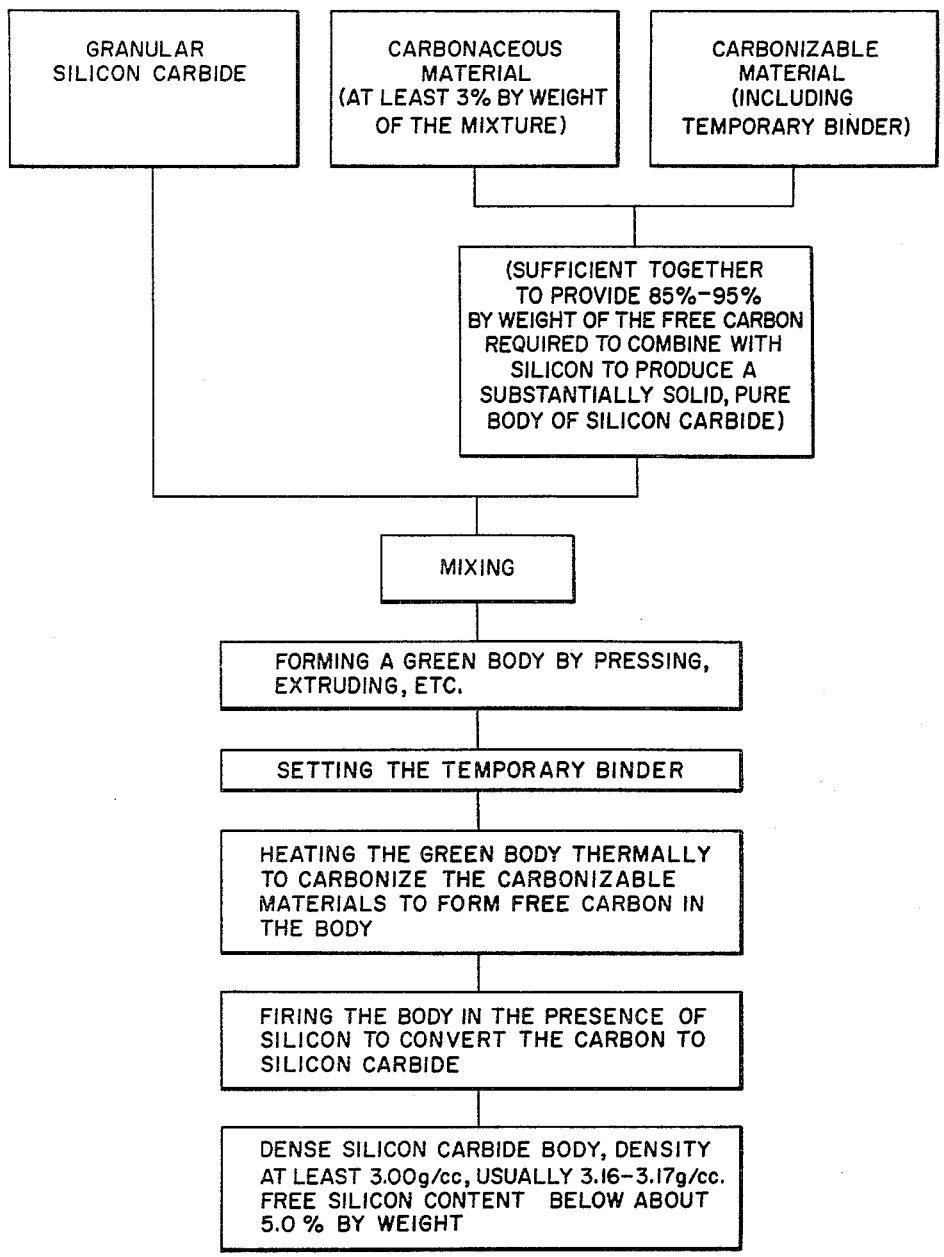
INVENTOR.
JAMES C. ANDERSEN
ATTORNEY

United States Patent Office 2,938,807
Patented May 31, 1960

2,938,807

METHOD OF MAKING REFRACTORY BODIES

James C. Andersen, Niagara Falls, N.Y., assignor, by mesne assignments, to the United States of America as represented by the United States Atomic Energy Commission Filed Aug. 13, 1957, Ser. No. 678,017

14 Claims. (Cl. 106—44)

This invention relates to the manufacture of silicon carbide bodies that are characterized by high density, high purity, and superior resistance to oxidative deterioration.

Silicon carbide is an excellent material for many specialized purposes that require refractory characteristics, hardness, and resistance to erosion, such as for example, high temperature crucibles and rocket nozzles. It has long been recognized, however, that the so-called "dense" silicon carbide bodies that are made by many of the proposed techniques, particularly those proposed prior to the last year or two, are relatively porous. The porosity of ordinary so-called "dense" bodies of silicon carbide is detrimental because silicon carbide oxidizes at high temperatures, and the pores permit air to circulate within the body so that oxidation occurs throughout the entire body.

To make silicon carbide bodies that are less porous and more dense, and hence, less susceptible to oxidation and more refractory, many techniques have been developed. For example, according to one such technique, silicon carbide granules are bonded together by an interstitial bond consisting of a solid solution of carbides including zirconium carbide and other carbides such as silicon carbide or boron carbide, or a mixture of silicon and boron carbides. Bodies made in this way are dense and do resist oxidation, but because materials other than silicon carbide are present, the properties of the bodies are less desirable than would be the case if the bodies consisted entirely of silicon carbide.

More recently, dense refractory silicon carbide bodies, that are substantially free of materials other than silicon carbide, have been obtained by forming a recrystallized, porous silicon carbide body structure, impregnating the pores of the body with a carbonizable material such as furfural, carbonizing this material by heating or with mineral acid, to fill the pores with carbon, and then firing the carbon-impregnated body in the presence of silicon, to cause the silicon to penetrate the pores and react with the carbon to form additional silicon carbide. This process requires two firing steps and usually takes one week or more to perform. A longer time is required when the impregnation and siliconizing steps are repeated to increase the density of the bodies.

One object of the present invention is to provide a practical method of making bodies of very high density that are composed primarily of silicon carbide, with controlled minor amounts of carbon and silicon.

Another object of the invention is to provide a process of making silicon carbide bodies of very high density and purity, which process will require only a single firing step and hence, can be performed within a relatively short space of time. A related object of the invention is to provide a process of the character described, that is adaptable to mass production requirements.

Other objects of the invention will become apparent to those skilled in the art from the following detailed description of the invention.

According to the present invention, dense silicon carbide bodies are obtained by a process in which granular silicon carbide, a carbonizable material, and a carbonaceous material are mixed together, then the mixture is shaped as desired, and then the shape is fired in the presence of more than the stoichiometric amount of silicon. The carbonizable material preferably includes a temporary binder that is set before the firing step, to hold the mix in shape for firing.

The total amount of carbonizable and of carbonaceous material in the mixture is carefully controlled so that the total amount of free carbon from both sources, after the carbonizable material has been decomposed in the early phase of the firing step, is between about 85% and about 95% of the amount of carbon required to react with silicon to produce a body of pure, solid silicon carbide substance that is truly free from pores. The importance of maintaining the total amount of free carbon within this range will be demonstrated in the more detailed description of the invention that follows.

The density of the carbon in a shape that is made from the mixture, after carbonizing, must not exceed the density of carbon that will siliconize to form dense silicon carbide. Therefore, the pressure applied to the mix, to form a shape for firing, must be carefully controlled.

The process of the invention can be performed completely within a few hours, in contrast to the much longer period of time that is required for other processes that have been proposed or used for the production of dense silicon carbide bodies.

The bodies that are obtained have a very high density, approaching the theoretical density of 3.23 grams per cc. for pure silicon carbide. The density of the bodies that are obtained is consistently greater than 3.00, and may be as high as 3.18. On continuous production runs, bodies are consistently obtained with densities of 3.16 to 3.17. The bodies consist of silicon carbide together with a small amount of unreacted silicon, about 5% by weight or less, and preferably about 3% or less, based on the body, that is found primarily in the interstitial spaces of the body.

The broad steps of the process of this invention are shown in outline form in the drawing that accompanies this description.

As shown in the drawing, the raw materials from which the dense bodies of silicon carbide are made include a granular silicon carbide, carbonaceous material, and carbonizable material.

Granular silicon carbide of hexagonal crystalline habit, and of any readily available particle size, may be employed. The particle size does not appear to be critical. However, it has been observed that coarse grits of silicon carbide give a body of higher density than fine grits, and less carbon is required to fill the pores. Mixtures of grit sizes are usually employed, however, to reduce to a minimum the total volume of the spaces between the particles of silicon carbide.

The required total amount of carbonaceous and of carbonizable material should be freshly computed for each new shape that is desired. The calculations for total carbon (that amount in the mixture from the carbonizable material after carbonization, and from the carbonaceous material) are not difficult. The volume of a shape changes so slightly, if at all, during firing, that it can be said to be constant, and this facilitates the computations.

For example, if a shaped body is desired whose volume is 30 cc., it can be computed that the weight of the body would be 96 gr., if made of pure silicon carbide having a density of 3.2 g./cc. If silicon carbide granules that are to be used to form a body are formed into the desired shape, with the volume of 30 cc., and this volume of granules is found to weigh 75 g., then the density of the granules is 2.5 g./cc. This means that the shape must pick up 21 g. to have a weight equivalent to that of pure solid silicon carbide. Since carbon comprises about three-tenths by weight of pure silicon carbide, about three-tenths of the 21 g. that are needed must come from carbon; thus (0.3) (21)=6.3 g. of carbon are required.

However, I have found that desirable bodies are obtained only when about 85%–95% of this theroretical amount is employed, and optimum results are obtained at 90% of theoretical. Beyond these limits, the bodies obtained have undesirable properties, as will be demonstrated in the examples of the invention that will be described presently. Therefore, the amount of carbon to be used, for an optimum body, is (0.9) (6.3)=5.7 g.

Therefore, 5.7 g. of total carbon should be thoroughly mixed with the granules of silicon carbide. The total carbon will be derived partly from carbonizable material and partly from carbonaceous material. The carbonizable material should include a temporary binder that can be set to hold the mixture in shape for firing. The carbon-containing materials will occupy void spaces in the mass of silicon carbide granules, and will not change the volume. After the temporary binder has been set, the shape can be fired in the presence of silicon, and a dense body of substantially pure silicon carbide is obtained. Since the 5.7 g. of total carbon will combine with seven-thirds as much silicon, the final weight of the body will be approximately:

```
            75           SiC Granules
           5. 7 g.       total carbon
(5.7) (7/3)=13. 3 g.     of Silicon
           ―――――
           94. 0 g.      total weight of body
```

The density of this body is $$\frac{94 \text{ g.}}{30 \text{ cc.}} = 3.13 \text{ g./cc.}$$

The total carbon is and must be derived from two sources: carbonizable material and carbonaceous material. Satisfactory dense bodies are not obtained unless both types of material are employed.

The expression "carbonaceous material" is employed herein to refer to graphite, amorphous carbon, or some other type of free carbon. Graphite is the preferred form for use, but pitch coke, charcoal flour, and the like, may also be employed. A preferred form of graphite is a finely divided form having a large proportion of particles about 2 microns in diameter, with a minimum size below 2 microns and a maximum particle size of about 10 microns.

The expression "carbonizable material" is employed to refer to materials that can be decomposed to form free carbon. Such materials may include a resinous temporary binder, plasticizing material, and other minor modifying ingredients. Condensation products of the aldehydes and phenols, and particularly, liquid condensation products of resorcinol and formaldehyde, and other similar synthetic resins, are preferred for use as the resinous temporary binder. Diglycol stearate, "Methocel," or the like, are excellent plasticizers. "Methocel" is a trademark that is used to identify a water-soluble, methyl cellulose in the form of a finely divided white solid material.

While both carbonaceous and carbonizable materials must be used, and in sufficient amount to provide 85% to 95% of the total theoretical free carbon required, the relative proportions of these two materials are quite flexible. In general, the amount of carbonaceous material must be at least about 3% by weight of the mixture, to obtain a satisfactory body.

In addition, the final average packing density of the carbon in a shape, after carbonization, is very important. Carbon can be compacted to very high densities, but carbon of densities over about 0.92–0.93 g./cc. is undesirable in the formation of dense silicon carbide since more dense carbon will cause a change in the volume of a shape during siliconizing.

This phenomenon is more readily understood by considering the conversion of a dense carbon to silicon carbide. For example, assume that a carbon body has a volume of 50 cc. and a weight of 100 g., and therefore a density of 2.0 g./cc. If this carbon were to be completely converted to silicon carbide, the silicon carbide would have ten-thirds the weight of the carbon, or $$(100 \text{ g.}) (10/3) = 333 \text{ g.}$$

Since the density of pure silicon carbide is 3.2 g./cc., this body of silicon carbide would occupy a minimum volume of 104 cc. This is an increase of 54 cc. over the original volume of the carbon.

Optimum carbon density, for conversion to silicon carbide without volume change, on calculation is in the neighborhood of 0.92–0.93 g./cc.

In preparing a mix according to this invention, for best results, the average carbon density of carbon in the shape, after carbonization, should not exceed this figure. The process is operative above this figure for carbon density, but volume changes occur, and such changes are frequently undesirable. This is particularly true because dense silicon carbide is so difficult to machine, and often, it is desired to obtain a product that does not need finishing. To some extent, therefore, depending upon the mix that is employed, the pressure that is used in forming the mixture into a shape, for firing, should be carefully controlled, to avoid compacting the carbon beyond the point where an undesirably high carbon density is obtained after carbonization.

In practice, where bodies of different shapes and other characteristics are to be produced, it is usually desirable to conduct the process initially on a somewhat empirical basis for each new shape, as to the best proportions of ingredients, within the limits already stated, for any particular article. Thus, when a standard shape is to be produced in quantity, a "pilot" body may be made, and thereafter, any indicated minor adjustments in the proportions of the ingredients can be made to obtain a body having optimum characteristics, within the limits already stated.

In a preferred method for the practice of the invention, the silicon carbide grains are thoroughly mixed by tumbling. The graphite or other carbonaceous material is then added, and tumbling is continued. After the carbonaceous material and the granular silicon carbide are thoroughly mixed, the carbonizable materials, including the resinous temporary binder, are blended into the mixture. To break up any aggregates, the mixture is then passed through a coarse screen.

This raw mixture is then pressed at high pressures, extruded, or otherwise suitably molded to the desired shape, and is then oven-dried to remove the volatiles of the temporary binder. The shape is then heated to a sufficiently high temperature thermally to carbonize the carbonizable materials, to form free carbon in the body. This body is then fired at a temperature of about 2250° C. in the presence of elemental silicon. The firing should be carried out in an inert atmosphere or in a nitrogen atmosphere or in an atmosphere which will leave elemental silicon at siliconizing temperatures and will not cause the silicon carbide to decompose. A firing temperature as low as about 1850° C. could be used, but a higher temperature is preferred. Temperatures that are above the decomposition temperature of silicon carbide are to be avoided.

To insure that all of the carbon is converted, a stoichiometric excess of silicon is employed. The body is held in the furnace for a short period, approximately fifteen minutes to thirty minutes, or longer, to allow time for the silicon to react with the carbon and form silicon carbide, and to allow time for the silicon carbide to convert to the hexagonal crystalline form, and also to drive off residual unreacted silicon.

The resultant bodies consist of substantially pure silicon carbide which is in the hexagonal form where the preferred high firing temperature is employed. The content of free silicon is ordinarily about 3% or less. The density is over 3.0, and usually exceeds 3.10. On quantity production, consistent densities of 3.16–3.17 g./cc. are obtained. The bodies are 95% or more pure silicon carbide, and photomicrographs reveal infrequent small carbon inclusions, a few small voids, and a small amount of free silicon, in a matrix of well developed crystals of silicon carbide that form a continuous network.

The following specific examples serve further to illustrate the exact manner in which the present invention is practiced.

EXAMPLE 1

The following ingredients were employed:

Silicon carbide: Parts by weight
- −14+36 mesh _____ 39.6
- −80 mesh _____ 44.0
- 7 to 55 microns _____ 4.4

Total SiC _____ 88.0

Graphite, −15 mesh _____ 8.0
Liquid phenol-formaldehyde condensation product;
"Varcum No. V8121" _____ 6.8
Furfural _____ 3.0

In the foregoing and following lists of ingredients, the square power of a mesh number represents the number of mesh openings per square inch in the screen.

The silicon carbide granules were mixed by tumbling, then the graphite was added and the tumbling was continued. Finally, the furfural and the resin were blended into the mix. The mix was then passed through a 10 mesh screen.

The mix was shaped by pressing to form several specimens. These specimens were dried at 100° C. overnight, and then were further heated at 160° C. for about two hours. The average dried density was 2.52 g./cm.$^3$.

The dried specimens were placed in a graphite crucible with excess silicon, and were then fired by heating to 2250° C. The graphite crucible and its contents were held in an atmosphere of argon. The silicon was present in an amount calculated as about 50% in excess of the amount necessary to convert the carbon to silicon carbide. After 15 minutes in the argon atmosphere at about 2250° C., the specimens were allowed to cool in the furnace, in the inert atmosphere.

The specimens had a fired density in the range of 3.12 to 3.15 g./cm.$^3$.

Following the procedures just described, several additional specimens were prepared. Helium and nitrogen were sometimes used rather than argon, in firing.

EXAMPLE 2

Using the same procedure, the following mix was prepared and fired:

Silicon carbide: Parts by weight
- −14+36 mesh _____ 39.24
- −80 mesh _____ 43.59
- 7 to 55 microns _____ 4.36

87.19

Graphite _____ 6.71
"Varcum No. V8121" phenolformaldehyde resin __ 6.10

An excellent dense body was obtained.

Again following the same procedure, several additional bodies were made, as will now be described.

EXAMPLE 3

The compositions of several different mixtures are set forth in the table below. These mixtures were made from silicon carbide grit that was relatively coarse. The density of the bodies obtained, and their free silicon content, are also indicated.

Table 1
COARSE GRIT PRESSED MIX

| Ingredients | Low Carbon | Medium-Low Carbon | Intermediate Carbon | High Carbon |
|---|---|---|---|---|
| 14 to 36 mesh SiC | 40.0 | 39.6 | 39.6 | 38.0 |
| −80 Mesh SiC | 44.5 | 44.0 | 44.0 | 42.2 |
| 7-55 Micron size SiC | 4.5 | 4.4 | 4.4 | 4.2 |
| Graphite "Dixon 200-10" Joseph Dixon Crucible Co., Jersey City | 3.0 | 4.0 | 8.0 | 8.05 |
| "Varcum #V8121" Resin, Varcum Chemical Co. | 8.0 | 8.0 | 4.0 | 7.63 |
| Furfural | | | 3.0 | |
| Dry pressed dens., g./cm.$^3$ | $^1$ 2.69 | 2.62 | 2.55 | 2.55 |
| Calculated, Percent Theor. Carbon | 70 | 80 | 90 | 100 |
| Fired dens., g./cm.$^3$ | 3.11 | 3.12 | 3.13 | Partial Siliconization |
| Percent free Si | 8.0 | 6.2 | 3.0 | |

$^1$ Wet pressed density.

The carbon content of the "Varcum V8121" resin is about 40% to 50% by weight. This facilitates the various computations. "Varcum V8121" is a trademark for a liquid phenol-formaldehyde condensation product.

The "low carbon" mixture in Table 1 demonstrates that 70% of theoretical carbon is too little for good results. The amount of free silicon in the product is too high. When more than about 5% by weight of free silicon is present in a silicon carbide body, the silicon spews out at high temperatures.

The medium-low carbon mix, made with 80% of theoretical total carbon, produced a body containing 6.2% free silicon. This body was also undesirable for that reason, despite the good density.

The "high carbon" mixture demonstrates that if 100% of theoretical carbon is employed, the silicon reacts with the carbon only at the exterior of the body where initial access and entry to the body is made by the silicon. The reaction product, silicon carbide, blocks off from the pores quickly and prevents further entry of silicon into the body. Thus, only partial siliconization occurs. A core was obtained that had unreacted carbon and was porous. Hence, this body was lacking in refractory character and strength, and was undesirable.

Of the bodies described in Table 1, only the mix containing 90% of theoretical carbon produced a good dense body. This body had an excellent structure as revealed in photomicrograph. The modulus of rupture at 25° C. was about 16,000 p.s.i., and at 1000° C. was about 17,000 p.s.i. The modulus of elasticity at 25° C., was about 53.04×10$^6$ p.s.i., and at 1000° C., was about 50.14×10$^6$ p.s.i.

The effect of using a fine grit silicon carbide in the mix is demonstrated in the following example.

EXAMPLE 4

It will be noted in the mixes below that total carbon content is in the critical range of 85% to 95% theoretical, and that excellent bodies were obtained in each case. The same procedure was followed as described in Example 1, except that the mixes were extruded to shape rather than pressed.

Table 2
FINE GRIT EXTRUDED MIX

| Ingredients | Intermediate Carbon | Intermediate Carbon |
|---|---|---|
| 100 mesh SiC | 40.3 | 42.5 |
| 220 mesh SiC | 12.2 | 11.6 |
| FFF mesh SiC (7 to 55 microns, Avg. 20 microns) | 12.2 | 14.1 |
| 1,000 mesh SiC (2½ to 30 microns, Avg. 6-7 microns) | 7.5 | 9.0 |
| "Varcum #V8121" Resin | 19.4 | 15.8 |
| Graphite "Dixon 200-10" | 8.0 | 7.0 |
| Gum Tragacanth | 5.0 | 2.3 |
| "Aresklene"[1] wetting agent | 5.0 | .3 |
| Dry Extruded dens., g./cm.$^3$ | 2.17 | 2.38 |
| Calculated Percent Theoretical Carbon | 89 | 90 |
| Fired Dens., g./cm.$^3$ | 3.10 | 3.04 |
| Free Si, percent | 3-4 | 2.00 |

[1] "Aresklene" is a trademark for dibutyl phenylphenol sodium disulfonate, a wetting agent.

EXAMPLE 5

Similar fine grit mixes were then made up, pressed to shape, and fired in the manner described above, with the following results:

Table 3
FINE GRIT PRESSED MIX

| Ingredients | Low Carbon | Intermediate Carbon |
|---|---|---|
| 100 mesh SiC | 49.5 | 48.5 |
| 220 mesh SiC | 13.4 | 13.1 |
| FFF mesh SiC (7 to 55 microns, avg. 20 microns) | 12.3 | 12.1 |
| 1,000 mesh SiC (2½ to 30 microns, avg. 6-7 microns) | 8.2 | 8.1 |
| Graphite "Dixon 200-10" | 9.3 | 9.6 |
| "Varcum V8121" Resin | 9.3 | 8.6 |
| Furfural | | 2.9 |
| Wet pressed dens., g./cm.$^3$ | 2.40 | 2.50 |
| Calculated Percent Theoretical Carbon | 80 | 90 |
| Fired dens., g./cm.$^3$ | 3.05 | 3.10 |
| Percent Free Si | 7.8 | 3.1 |

It will be noted that in the "low carbon" mix using 80% of theoretical total carbon, the free silicon content of the body was 7.8%, which is not satisfactory. In contrast, the "intermediate carbon" mix, containing 90% of total theoretical carbon, produced an excellent dense body.

Comparative cross-sections of several bodies that have been produced, in photomicrographs, indicated that bodies made from fine grit mixes tend to have fewer voids than bodies made from coarse grit mixes. While the preferred total free carbon content of the mix before siliconizing is 85% to 95%, approximately, a more preferred range is 88% to 93%, inclusive.

The dense bodies obtained by the process of this invention are eminently suitable for refractory applications, particularly those where hardness and chemical inertness are advantageous. Typical applications include, for example, vessels and piping for corrosive materials such as hydrofluoric and nitric acids and their corrosive derivatives; crucibles for melting silicon and other high melting substances; and rocket nozzles.

By way of contrast with the present process, it can be pointed out that if a body is prepared by siliconizing a mix that contains only granular silicon carbide and carbonizable material, the maximum density obtainable in the body is about 3.00 g./cm.$^3$, and the percentage of free silicon in the body is usually above 12%. Such a body is not desirable for many purposes because of the large silicon content and because its refractory properties are inferior.

While this invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

I claim:

1. A process for making articles of dense silicon carbide, containing less than about 5% free silicon, comprising: forming a substantially homogenous mixture of granules of silicon carbide, a carbonaceous material comprising at least about 3% by weight of said mixture, and a carbonizable material including a temporary binder, the total amount of carbon in said carbonaceous material and in said carbonizable material in said mixture being between about 85% and about 95% of the stoichiometric amount that is required to react with silicon to form a completely solid body of silicon carbide from a shape that is formed from said mixture; forming said mixture to shape; setting said binder to rigidify said shape; and firing said shape at a temperature of at least about 1850° C. to effect carbonization and below the decomposition temperature of silicon carbide, in an atmosphere that will leave elemental silicon and that will not cause the decomposition of silicon carbide and in contact with at least sufficient silicon to react with all of the available carbon, the average bulk density of the carbon in said shape after carbonization being below about 0.92 to 0.93 g./cc.

2. The process of claim 1 in which the temporary binder is a heat hardening binder, and including the step of heating the shaped mixture to set said binder.

3. The process of claim 2 in which the temporary binder is a phenol-formaldehyde condensation product.

4. The process of claim 1 in which said shape is fired at a temperature of about 2250° C.

5. The process of claim 1 in which the silicon is present in stoichiometric excess, at the beginning of the firing step.

6. The process of claim 1 in which the total amount of carbon in said carbonaceous material and in said carbonizable material in said mixture is between about 88% and about 93% of the stoichiometric amount that is required to react with silicon to form a completely solid body of silicon carbide from a shape that is formed from said mixture.

7. The process of claim 1 in which the total amount of carbon in said carbonaceous material and in said carbonizable material in said mixture is about 90% of the stoichiometric amount that is required to react with silicon to form a completely solid body of silicon carbide from a shape that is formed from said mixture.

8. A process for making articles of dense silicon carbide, containing less than about 5% free silicon, comprising: forming a substantially homogeneous mixture of granules of silicon carbide, a carbonaceous material comprising at least about 3% by weight of said mixture, and a carbonizable material, the total amount of carbon in said carbonaceous material and in said carbonizable material being between about 85% and about 95% of the stoichiometric amount that is required to react with silicon to form sufficient silicon carbide to form a completely solid body of silicon carbide from a shape that is formed from said mixture; forming a shape from said mixture; and firing said shape in contact with at least sufficient silicon to react with all of the available carbon and at a temperature of at least about 1850° C. to effect carbonization and to bring about this reaction and below the decomposition temperature of silicon carbide and in an atmosphere that will leave elemental silicon and that will not cause the decomposition of silicon carbide, the average bulk density of the carbon in said shape after carbonization being below about 0.92 to 0.93 g./cc.

9. A process for making articles of dense silicon carbide, containing less than about 5% free silicon, comprising: forming a substantially homogeneous mixture of granules of silicon carbide, a carbonaceous material comprising at least about 3% by weight of said mixture, and a carbonizable material including a settable temporary binder, the total amount of carbon in said carbonaceous material and in said carbonizable material being between about 88% and about 93% of the stoichiometric amount that is required to react with silicon to form sufficient silicon carbide to form a completely solid body of silicon carbide from a shape that is formed from said mixture; forming a shape from said mixture; setting said binder; and firing said shape at a temperature of at least about 1850° C. to effect carbonization and below the decomposition temperature of silicon carbide in an atmosphere that will leave elemental silicon and that will not cause the decomposition of silicon carbide, and in contact with at least sufficient silicon to react with all of the available carbon, the average bulk density of the carbon in said shape after carbonization being below about 0.92 to 0.93 g./cc.

10. A process for making articles of dense silicon carbide, containing less than about 5% free silicon comprising: forming a substantially homogeneous mixture of granules of silicon carbide, a carbonaceous material comprising at least about 3% by weight of said mixture, and a carbonizable material including a settable temporary binder, the total amount of carbon in said carbonaceous material and in said carbonizable material being between about 88% and about 93% of the stoichiometric amount that is required to react with silicon to form sufficient silicon carbide to form a completely solid body of silicon carbide from a shape that is formed from said mixture; compacting said mixture and forming a shape from said mixture; setting said binder to hold said mixture in said shape; and firing said shape at a temperature in the range between about 1850° C. to effect carbonization and below the decomposition temperature of silicon carbide in an atmosphere that will leave elemental silicon and that will not cause the decomposition of silicon carbide, and in contact with more than sufficient silicon to react with all of the available carbon, the average density of the carbon in said shape after carbonization being below about 0.92 to 0.93 g./cc.

11. A process for making articles of dense silicon carbide, containing less than about 5% free silicon, comprising; forming a substantially homogeneous mixture of granules of silicon carbide, a carbonaceous material and a carbonizable material including a settable temporary binder, said carbonaceous material comprising at least about 3% by weight of said mixture, and the total amount of carbon in said carbonaceous material and in said carbonizable material being between about 85% and about 95% of the stoichiometric amount that is required to react with silicon to form sufficient silicon carbide to form a completely solid body of silicon carbide from a shape that is formed from said mixture; compacting said mixture and forming a shape from said mixture; setting said binder; and firing said shape in an inert atmosphere and at a temperature in the range of between about 1850° C. and below the decomposition temperature of silicon carbide to effect carbonization and in contact with more than sufficient silicon to react with all of the available carbon, the average density of the carbon in said shape after carbonization being below about 0.92 to 0.93 g./cc.

12. A process for making articles of dense silicon carbide, containing less than about 5% free silicon, comprising: forming a substantially homogeneous mixture of granules of silicon carbide, a carbonaceous material comprising at least about 3% by weight of said mixture, and a carbonizable material including a settable temporary binder, said carbonaceous material comprising a form of carbon of low density and that has a particle size of about 2 microns with a maximum particle size of about 10 microns, the total amount of carbon in said carbonaceous material and in said carbonizable material being between about 85% and about 95% of the stoichiometric amount that is required to react with silicon to form sufficient silicon carbide to form a completely solid body of silicon carbide from a shape that is formed from said mixture; forming a shape from said mixture; setting said binder to hold said mixture in said shape; and firing said shape at a temperature of at least about 1850° C. to effect carbonization and below the decomposition temperature of silicon carbide in an atmosphere that will leave elemental silicon and that will not cause the decomposition of silicon carbide, and in contact with more than sufficient silicon to react with all of the available carbon, the average bulk density of the carbon in said shape after carbonization being below about 0.92 to 0.93 g./cc.

13. A process for making articles of dense silicon carbide, containing less than about 5% free silicon, comprising: forming a substantially homogenous mixture of granules of silicon carbide, a carbonaceous material and a carbonizable material including a temporary binder, said granules of silicon carbide being graded to provide a minimum amount of free space in said mixture when compacted, said carbonaceous material comprising at least 3% by weight of said mixture and having a particle size below about 10 microns, and the total amount of carbon in said carbonaceous material and in said carbonizable material in said mixture being between about 85% and about 95% of the stoichiometric amount that is required to react with silicon to form a completely solid body of silicon carbide from a shape that is formed from said mixture; compacting said mixture and forming said mixture to shape; setting said binder to hold said mixture in said shape; and firing said shape at a temperature in the range of between about 1850° C. and below the decomposition temperature of silicon carbide in an inert atmosphere and in contact with more than sufficient silicon to react with all of the available carbon, the average density of the carbon in said shape after carbonization being below about 0.92 to 0.93 g./cc.

14. The process of claim 13 in which said binder is a phenol-formaldehyde condensation product, and in which said setting step comprises heating said mixture to set said condensation product.

References Cited in the file of this patent

UNITED STATES PATENTS

| | | |
|---|---|---|
| 1,013,701 | Tone | Jan. 2, 1912 |
| 1,266,478 | Hutchins | May 14, 1918 |
| 2,431,326 | Heyroth | Nov. 25, 1947 |
| 2,431,327 | Geiger | Nov. 25, 1947 |